United States Patent Office 3,190,841
Patented June 22, 1965

3,190,841
THERMOPLASTIC 5-ALLYLISOCYANURATE POLYMER
William C. Francis, Overland Park, Kans., assignor, by mesne assignments, to Gulf Oil Corporation, Pittsburgh, Pa., a corporation of Pennsylvania
No Drawing. Filed Jan. 22, 1962, Ser. No. 167,936
13 Claims. (Cl. 260—2)

This invention relates to isocyanurate polymers and processes for their preparation. More particularly, it relates to curable thermoplastic isocyanurate polymers, cured compositions thereof, and related processes, wherein said thermoplastic polymers are comprised of units having the following chemical structure:

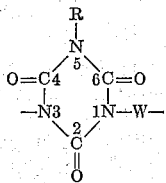

in which W represents a divalent hydrocarbon organic radical having terminal methylene groups and wherein R represents a polymerizable radical having an allylic configuration, i.e.,

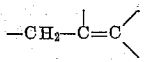

Both the W and R radicals are further defined as being free of substituents which are reactive with allylic halides and isocyanurate nuclei under polymer-forming reaction conditions. "Reactive substituents" as used herein in speaking of W and R radical substituents is used with reference to a reactivity which interferes with the formation of the thermoplastic polymers of this invention. A single polymer of this invention can contain combinations of either or both W and R radicals.

The configuration of the W radical can be alternatively presented simply by the following formula:

methylene-Z-methylene in which methylene represents a non-substituted methylene group (—CH$_2$—) as well as methylene groups wherein one or both of the hydrogens of the methylene group has been replaced by another substituent, e.g., by a lower alkyl radical such as methyl. There is of course the additional limitation on any substituent on the methylene group that such substituent not prevent, as by steric hindrance, the coupling of nitrogen atoms of the isocyanurate nuclei through the W radicals to provide the linkage necessary for polymer formation. Z in the above formula is the necessary portion of the W radical bridging the terminal methylene groups. In some polymers provided hereby, the Z group will merely represent a carbon to carbon bond joining the terminal methylene groups, in which instance W as a whole then would represent an ethylene radical. Therefore, it is seen that the minimum size of the W radical is a C$_2$ hydrocarbon chain.

W in the above formula can vary greatly within the limitations of being a divalent radical of a hydrocarbon organic character and being free of reactive substituents as defined above. W can be a straight-chain radical; it can be saturated or unsaturated; it can contain cyclic structures, such as aryl, cycloalkyl, or heterocyclic rings; it can contain branched chain structures; and the like. The W radical contains at least two carbon atoms and preferably at least four carbon atoms. There is much latitude as to the magnitude of the W radical depending upon the chemical configuration of the radical and the availability either commercially or through synthesis of the reactant to form the W radical in the contemplated curable thermoplastic polymer of this invention. Generally, it will be desired to employ a W-providing reactant having from two to about twenty-two carbon atoms and preferably having from about four to about sixteen carbon atoms. Preferably, the W radical will contain a beta olefinic unsaturation (such as present in a 2-butenylene radical) or will be a xylylene or bis(tolylene)oxy radical, free of reactive substituents.

Illustrative of permissible substituents on W radicals are the following in unreactive form: lower alkyl groups such as methyl, ethyl, propyl, and isobutyl, halo radicals such as chloro, fluoro, and bromo, nitro groups, phenyl groups, and the like.

Illustrative dihalo reactants wihch can be employed in providing the W radicals in the curable thermoplastic polymers of this invention include the following: alkane compounds such as 1,2-dichloropropane, 1,3-dichlorobutane, 1,4-dichloropentane, pentaerythrityl bromide, 2,3-dibromo-2-methyl pentane, 1,5-dichloropentane, 1,6- dibromohexane, 1,6-diiodohexane, 1,7-dibromoheptane, 1,8-dibromooctane, 1,9 - dichlorononane; ether compounds such as 4,4'-dichlorodiamyl ether, chloromethyl-β-chloroethyl ether, bis(chloromethyl)hydroquinone dimethyl ether, bis(chloromethyl)-m-chloroanisole, and bis(chloromethyl)methyl phenyl thioether; alkyne compounds such as 1,4-dichlorobutyne; alkene compounds such as 1,4 - dichlorobutene-2, 1,4-bromo-2-methyl-2-butene, and the like; alicyclic compounds such as 1,2-dichlorocyclohexane, 1,1-bis-(bromomethyl)-cyclohexane, and the like; alkyl aryl compounds such as bis(p-chloromethylphenyl)methane, bis(chloromethyl)mesitylene, and the like; polycyclic compounds such as 9,10-bis(chloromethyl)anthracene, p,p'-dichloromethyl diphenyl, and the like; aromatic compounds such as 6,8-bis(chloromethyl)benzo-1,3-dioxane, bis(chloromethyl) - o - cresol, bis(chloromethyl) - p-bromotoluene, bis(chloromethyl) xylenes of the formulas

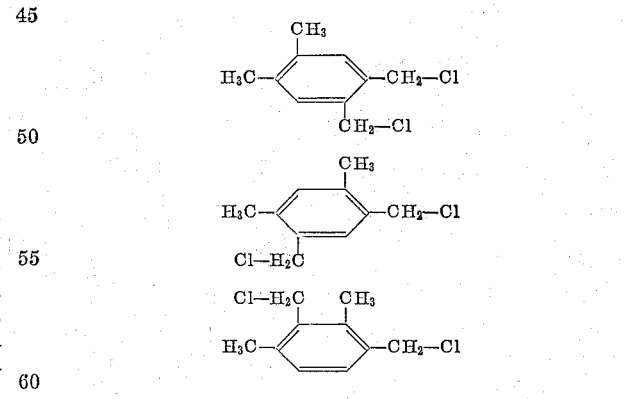

and the like.

W radicals which are non-reactive as above defined wherein one or more of the carbon atoms are replaced by other atoms can be employed. For example, N, S, O, and the like atoms can replace one or more of the carbon atoms of a W radical if such carbon atom substitution does not preclude the desired properties and the formation of the polymers. It is to be understood that polymers having such W radicals having the carbon atom replacements coming within the scope and spirit of this invention are included herein.

The following clearly shows as an illustration the replacement of a carbon atom in a W radical in forming analogous polymers. The necessary reactants are chloromethylation products of the respective diphenyl compounds:

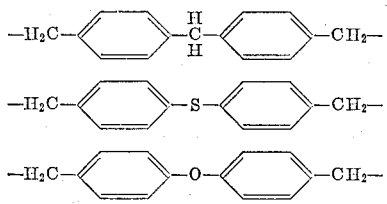

As stated above, R represents polymerizable radicals having an allylic configuration, i.e.,

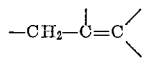

For example, R can be an unsubstituted allyl radical, a methallyl radical, or any other polymerizable substituted allylic group in which the substituent is non-reactive with allylic halides and isocyanurate nuclei under polymer-forming conditions. Such permitted substituents as lower alkyl, halo, mononuclear aryl, lower alkoxyl, and the like are illustrative. A portion of the R substituents instead of being allylic can be replaced by other radicals of a character not interfering with the polymer formation and being essentially non-reactive with allylic halides and isocyanurate nuclei. For example, a portion of the R radicals can be β-hydroxyethyl, benzyl, xylyl, substituted benzyl, methoxycarbonylmethyl, cyanomethyl, and the like. Preferably, at least about twenty percent of the R groups in polymers having average chain lengths are allylic radicals. The minimum number of the R radicals of the allylic configuration is dependent upon the lowest concentration which enables effective curing of the polymer to provide the derivable and desired cured, thermoset polymers.

The thermoplastic polymers of this invention are solids or viscous oils having a light tan to amber hue. The simple, unsubstituted embodiments of the polymers are customarily relatively soluble in chlorinated alkane solvents, for example, in ethylene chloride, methylene chloride, and chloroform and are relatively soluble in dimethyl formamide. They are customarily relatively insoluble in water and xylene. It will be well understood, however, that for example, solubility of the polymers can be altered substantially by presence of substituents such as hydroxyl groups on the R radicals.

The polymers of this invention are variable in respect to the number of the above described units per polymer chain, or stated alternatively, the molecular weight of the polymers can vary within reasonably wide limits, the minimum molecular size of the polymers being two isocyanurate nuclei joined by a W linkage, in which instance, the remaining unsubstituted nitrogens of the isocyanurate rings are occupied by R groups. In this event, there would be a molar ratio of four R groups; two isocyanurate rings; W linkage.

Somewhat greater than quantities equimolar to the W linkage providing agents, of both an isocyanurate salt and and R-providing agent can be used if the shorter chain lengths are desired. As is obvious from inspection of the above structural formula of the polymer unit, the molar concentration of the R-providing agent should not be less than the molar concentration of the cyanurate salt. However, if the molar concentration of the R-providing agent is in excess of that of the cyanurate salt, the effect to be expected is some diminishment of the average chain length of the polymers. It has been found that generally the preferred molecular sizes of polymers as determined by chemical and physical analyses will be of the order of from at least two to about thirty of the above defined units. Generally speaking, the molecular weight of the polymers should be of sufficient magnitude that their viscosities will be adequately high and their volatilities will be sufficiently low to permit convenient processing following procedures with which those having skill in this polymer art are presently equipped and familiar. Conversely, for the same considerations, the molecular weights of the polymers should not exceed a reasonable range.

As to the formation of the polymers, they are provided by the reaction of a dihalo compound capable of providing the W linkages coupling the isocyanurate nuclei, with at least equimolar amounts both of a cationic salt of cyanuric acid and a halide agent capable of providing the above defined R groups, in an inert liquid reaction medium at an elevated temperature. The liquid comprising the medium is advisably a dialkyl formamide or sulfone in which the dialkyl substituents have taken together from two to five carbon atoms, and N-alkyl substituted lactams such as pyrrolidones and piperidones in which the N-alkyl substituent has one to three carbon atoms. The presently preferred solvent media are dimethylformamide and dimethylsulfone. In carrying out the reaction, any convenient volume of solvent can be employed which will effect sufficient dissolution of the reactants and permit a satisfactory reaction rate. About two to ten parts of solvent by weight per part of reactants usually suffices.

The R providing reagent can be, as stated above, a 1-halo derivative of an R compound, in illustration, allyl chloride or bromide and corresponding methallyl halo derivatives. In respect to the formation of the W linkages, also appropriate dihalo derivatives having a halo substituent on each of the two terminal methylene groups capable of providing the linkages by a substitution reaction with the nuclear nitrogen atoms of the isocyanurate ring, can be used. Suitable agents for providing the links include such terminally halo-substituted agents as α,α'-dichloro derivatives of o, m, and p-xylene, and a p,p'-dimethyl-diphenyl ether, 1,4-dichlorobutene-2 and the like. It is to be understood that combinations of either or both of respective R- and W-providing agents can be employed in the production of the polymers.

The polymerization is carried on at elevated temperatures, suitably in the range of about 60° C. to about 150° C. A presently preferred reaction temperature for most of the polymer formations is the range of about 80° C. to about 120° C.

The reaction is suitably carried on by adding the cyanuric acid salt to the reaction medium and elevating the temperature of the mixture with agitation to a reaction temperature as above referred to. The salt is suitably an alkali metal salt such as the sodium or potassium salt, although any other suitable inorganic or organic salt can be employed which has the necessary solubility and compatibility in the reaction medium. Furthermore, although not presently preferred, the salt of the cyanuric acid can be formed in situ by adding cyanuric acid to the reaction medium and neutralizing the acid by adding the necessary equivalents thereto of a suitable base. To the heated cyanurate salt mixture, the agents providing the R groups and W linkages are desirably slowly added with stirring. For convenience and efficiency, these agents can be added dissolved in a minimum volume of the reaction solvent. Depending on the particular polymer prepared and the temperature employed, three to ten hours is usually sufficient to complete the reaction. The formed polymer is isolated by following conventional procedures, and the isolated polymer is washed to remove undesired reaction products and is dried.

The presently preferred procedure is more specifically illustrated hereafter wherein the polymer formed has 2-butenylene W linkages and has unsubstituted allyl groups ($-CH_2-CH=CH_2$) as R substituents. One mole part of trisodium isocyanurate is added to about five parts by weight of dimethylformamide and the slurry mixture is heated to a temperature from about 80° C. to about 100° C. A solution of three parts by weight of dimethylformamide containing one mole part of allyl chloride and one mole part of 1,4-dichlorobutene-2 are added dropwise with stirring over a period of two hours while maintaining temperature at the above elevated temperature range. Upon the completion of the addition, the reaction mixture is continuously stirred and maintained at a temperature of about 100° C. for an additional period of about three hours. The polymer is isolated from the reaction mixture by evaporating off the reaction solvent. The residue consisting of the crude polymer is washed with warm water to remove solvents, the sodium chloride reaction product, and the like. The polymer product is further successively treated with warm one percent by weight sodium hydroxide, ten percent by weight hydrochloric acid, distilled water, and finally with a lower alcohol, suitably methanol. The washed polymer on air drying is a white, finely divided solid.

Alternatively, in the above described processes, a dibasic salt of a 5-R substituted isocyanuric acid can be employed instead of the combination of a tribasic salt of cyanuric acid and the allyl halide reactants. This alternative procedure can permit a higher uniformity of product with a less rigid demand for reaction control.

The thermoplastic polymers are useful as ingredients in coating compositions. The polymers, particularly the solid materials, are also useful in certain molding applications where it is desired to have a thermoplastic material. However, a most interesting usefulness of the polymers is as intermediates for the formation of their cured, thermoset polymers.

The cured polymer compositions are of a thermoset character, having high thermostability, and are amenable to working employing presently known and employed procedures and equipment. The cured polymers can be provided by thoroughly admixing a curing agent (for example, one of the presently available, suitable peroxide or azo free radical initiators) with a polymer or combination of polymers. If desired, a polymerizable monomer can be added in suitable amounts to the polymer-curing agent admixtures, e.g., a styrene, diallylphthalate, or a polyallylisocyanurate monomer.

The curing admixture can be treated in order to bring about the desired cured polymer product as by the application of pressure at a fusion temperature which will bring about curing in a reasonably brief time interval, which temperature will generally exceed 100° C. It has been found that relatively short periods of time, for example two to ten minutes, is sufficient to bring about the desired joinder interaction of the individual polymer chains. Other methods for applying or utilizing the polymers in thermosetting application can be followed in accordance with procedures now employed in the art, for example, by following solvent or spraying procedures. Illustratively, a solution of polymer of this invention together with a curing agent in a volatile solvent such as dimethylformamide or ethylene chloride can be applied to a surface followed by a curing treatment in accordance with known coating or laminating procedures.

In respect to the curing agents, any of the currently used peroxides or other curing agents which are suitably reactive at appropriate temperatures are effective. Suitable illustrative peroxide catalysts can be selected from those enumerated in Table 6.2, Lawrence, Polyester Resins, 1960, pages 96 and 97. It has been found that the following illustrative peroxide curing agents can be employed: 2,5-dimethylhexane-2,5-dihydroperoxide, t-butyl perbenzoate and cumene hydroperoxide. Customarily, a relatively small quantity on the basis of the amount of polymer of the curing agent is required. It has been found suitable to employ as a general rule in the neighborhood of about one to about five percent by weight of the curing agent. However, it must be understood that the amount of the curing agent depends upon the particular reactivity of the curing agent under the conditions of curing, the concentration of the cross linkable groups in the thermoplastic polymer, and other considerations.

The cured polymers are characterized as unusually hard and heat stable thermoset resins. Employing the Barcol hardness test in which the testing instrument is the Barcol Impressor, the cured polymers show high hardness factors, usually in a value range of at least about 70 to about 100 and frequently between about 80 and 90. The cured polymers also show low weight losses on heat aging tests, for example, on continuous exposure to a temperature of 200° C. to 250° C. for at least about eighteen hours, there is usually only about one to three percent weight loss in preferred polymers such as 5-allylisocyanurate polymers having xylylene linkages. The cured polymers are usually transparent and often have light to medium coloring.

The thermoset resins in view of their excellent hardness and heat stability properties are useful in a number of consumer applications such as desk and countertops, various innerseals, appliance enclosure cabinets, structural laminates and the like.

In the molding of the thermoset resins, the powdered polymer-curing agent combinations can also be formulated prior to curing with quantities of conventional fillers and extenders such as chopped glass fiber, metal oxides such as magnesium, zinc and calcium oxides, finely divided asbestos, and the like. To illustrate, up to about equal parts of chopped glass fiber can be incorporated into the molding mixture to provide exceptionally strong, cured sheets.

This application is a continuation-in-part of my copending application Serial Number 57,390, filed September 21, 1960, now abondoned.

The following examples are provided in illustration of the compositions and processes of this invention and not in limitation thereof.

*Example 1*

PREPARATION OF 5-ALLYLISOCYANURATE POLYMERS HAVING XYLYLENE LINKAGES

A slurry of 30.2 g. (0.155 mol) of trisodium cyanurate in 150 ml. of dimethyl formamide is heated to 90° C. with stirring. A solution of 11.9 g. (0.155 mol.) allyl chloride and 27.1 g. (0.155 mol) of $\alpha,\alpha'$-dichloro-p-xylene in 100 ml. of dimethyl formamide is added dropwise over a period of three hours. Upon completion of the addition, stirring is continued at 100° C. for an additional 4.5 hours after which the reaction mixture is cooled to room temperature. The reaction mixture containing the desired polymer is washed with two 260 ml. portions of warm water causing the desired polymer product to separate as a finely divided, white solid. The solid product of 5-allylisocyanurate polymer is washed successively with 100 ml. of warm 1% aqueous sodium hydroxide, 100 ml. of 10% aqueous hydrochloric acid, 100 ml. of distilled water, and two 100-ml. portions of methanol. The washed polymer is dried at 60° C. Yield: 35.8 g.

The polymer product has a softening range beginning at about 200° C.

Equal volumes of N-methyl pyrrolidone can be substituted as solvent in the above procedure for the dimethylformamide employed. Additionally, $\alpha,\alpha'$-dibromo-p-xylene and allyl bromide can be employed in the above procedure on an equimolar basis instead of the $\alpha,\alpha'$-dichloride-p-xylene and the allyl chloride employed.

Following the above procedure, other polymers having units with the structure set out in the following table can be prepared by using the indicated required R and W linkage providing agents, in the same molar ratios:

TABLE I

| Isocyanurate Unit | R-forming Agent | W linkage Providing Agent |
|---|---|---|
| N—CH₂C(CH₃)=CH₂ on isocyanurate ring with —N—CH₂—C₆H₃(CH₃)—CH₂— | Methallyl chloride. | α,α′-Dichloro-6-methyl-m-xylene. |
| N—CH₂—CH=CH₂ on isocyanurate ring with —N—CH₂—C₆H₃(Cl)—CH₂— | Allyl chloride. | α,α′-2-trichloro-p-xylene. |
| N—CH₂—CH=CH₂ on isocyanurate ring with —N—CH₂—C₆H₂(Cl)(Cl)—CH₂— | ___do___ | α,α′-2,5-tetrachloro-p-xylene. |

*Example 2*

PREPARATION OF A 5-ALLYLISOCYANURATE POLYMER HAVING 2-BUTENYLENE LINKAGES

The procedure of Example 1 is repeated employing 19.5 g. (0.1 mol) of trisodium cyanurate, 15.3 g. (0.2 mol) of allyl chloride, and 6.25 g. (0.05 mols) of 1,4-dichlorobutene-2. The reaction mixture after cooling to room temperature, is filtered, and the removed precipitate is washed with dimethylformamide. The dimethylformamide wash and the filtrate are combined. The combined filtrate containing the desired polymer is concentrated to near dryness and the polymer residue is triturated with water. The polymer product is further washed as described in Example 1. The washed polymer is dried in vacuo over phosphorus pentoxide providing a substance having a highly viscous character. Yield: 15.7 g.

*Example 3*

PREPARATION OF AN ISOCYANURATE POLYMER HAVING 2-BUTENYLENE LINKAGES AND 5-ALLYL AND 5-CYANOMETHYL SUBSTITUENTS

The procedure of Example 1 is repeated using 19.5 g. (0.1 mol) of trisodium cyanurate, 12.5 g. (0.1 mol) of 1,4-dichlorobutene-2, 3.8 g. (0.05 mol) of allyl chloride, and 3.78 g. (0.05 mol) of chloroacetonitrile. The desired polymer is a white solid having a softening range beginning at about 102° C. Yield: 20.2 g.

*Example 4*

PREPARATION OF 5-ALLYLISOCYANURATE POLYMERS HAVING 2-BUTENYLENE LINKAGES

A slurry of 30.2 g. (0.155 mol) of trisodium cyanurate in 150 ml. of dimethylformamide is heated to 90° C. with stirring. A mixture of 11.9 g. (0.155 mol) of allyl chloride and 19.4 g. (0.155 mol) of 1,4-dichlorobutene-2 dissolved in 150 ml. of dimethylformamide is added dropwise to the cyanurate slurry over a period of three hours. Upon completion of the addition, the reaction is maintained at about 100° C. and continuously stirred for an additional period of 4.5 hours. The reaction mixture is cooled and filtered. The filter cake consisting of undesired reaction products such as sodium chloride is washed twice with 100-ml. volumes of dimethylformamide and is discarded. The filtrate containing the desired polymer and the dimethylformamide washings are combined. The solvent is removed from the combined filtrate by distillation under reduced pressure in a nitrogen atmosphere. The residue consisting of the desired polymer having 2-butenylene linkages is a highly viscous substance.

The crude viscous polymer is slurried with 100 ml. of distilled water with heating on a steam bath resulting in conversion of the polymer form to a granular, finely divided solid. The slurry is then acidified by the addition of 10% hydrochloric acid, and the acidified mixture is filtered. The filtrate is discarded. The removed precipitate is thoroughly washed successively with water and methanol, and is dried in vacuo. The desired dried 5-allylisocyanurate polymer having 2-butenylene linkages is a powdery, white solid having a melting range of 113–125° C.

Chlorine analysis of the crude product shows the polymer to have an average molecular weight of 22 units. The polymer is soluble in dimethylformamide, methylene chloride, and chloroform, but is relatively insoluble in acetone, methanol, benzene, and xylene.

Following the above procedure, other polymers having units with the structure set out in the following table can be prepared by using the indicated required R and W linkage providing agents, in the same molar ratios:

TABLE II

| Isocyanurate Unit | R-forming Agent | W linkage providing Agent |
|---|---|---|
| N—CH₂—C(CH₃)=CH₂ on isocyanurate ring with N—CH₂—C(CH₃)=CH—CH₂— | Methallyl chloride. | 2-methyl-1,4-dichlorobutene-2. |
| N—CH₂—CH=CH₂ on isocyanurate ring with N—CH₂—C(Cl)=CH—CH₂— | Allyl chloride. | 1,2,4-trichlorobutene-2. |

*Example 5*

PREPARATION OF 5-ALLYLISOCYANURATE POLYMERS HAVING BOTH 2-BUTENYLENE AND XYLYLENE LINKAGES

Following the procedure of Example 1, 19.5 g. (0.1 mole) of trisodium cyanurate, 7.7 g. (0.1 mol) of allyl chloride, 6.25 g. (0.05 mol) of 1,4-dichlorobutene-2, and 8.75 g. (0.05 mol) of α,α′-dichloro-p-xylene are employed in the reaction. The product of the desired 5-allylisocyanurate polymer having both 2-butenylene and xylylene linkages is a powdery, white solid having a softening range beginning at about 93° C. Yield: 20.1 g. (theoretical yield about 24.6 g.).

*Example 6*

PREPARATION OF 5-ALLYLISOCYANURATE POLYMERS HAVING W BIS(TOLYLYLENE)OXY LINKAGES

Following the procedure of Example 1, a polymer is formed employing

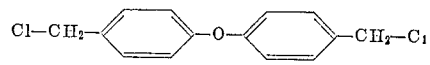

as the W-linkage forming agent instead of α,α′-dichlorop-xylene, in an equimolar amount. The polymer product has the following chemical units:

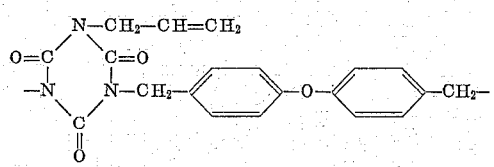

Yield: 54.3 g. (approximately a theoretical yield). The polymer product is a powdery, white solid and has a softening range beginning at about 146° C.

Following the above procedure, a polymer having the following chemical units can be prepared by employing

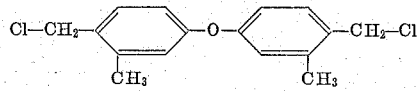

instead of

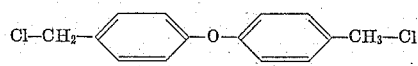

in an equimolar amount:

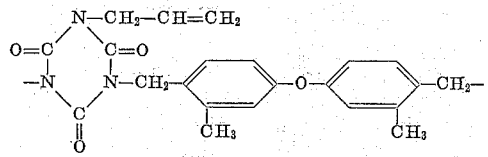

Example 7

PREPARATION OF CURED 5-ALLYLISOCYANURATE POLYMER HAVING 2-BUTENYLENE LINKAGES

A quantity of 2 g. of the 5-allylisocyanurate polymer having butenylene linkages as provided by Example 4 is thoroughly admixed with 0.04 g. of t-butyl perbenzoate. Portions of the mixture are cured in a 1-inch circular die using 600 p.s.i. of pressure and a temperature of 130° C. for three minutes. The resulting thermoset disc is strong, nearly transparent, and has a light red-brown color. Its Barcol hardness is 89. On subjection to heat aging test at 250° C. employing a forced air, recirculating oven, the following percent weight losses have been determined on the cured test discs: 16 hours, 3.4%; 41 hours, 3.9%; 67 hours, 4.5%; 120 hours, 5.9%; and 165 hours, 7.0%.

The above procedure is repeated employing the above curing composition to which an equal weight of chopped glass fiber wet with .03 g. of triallyl isocyanurate is added and thoroughly distributed. The resulting cured disc is a light colored disc with a Barcol hardness of 94.

Example 8

PREPARATION OF CURED POLYMERS

A quantity of 4.5 g. of the 5-allylisocyanurate polymer having xylylene linkages as provided in Example 1 is thoroughly admixed with 0.045 g. of the curing agent 2,5-dimethylhexane-2,5-dihydroperoxide to form an even distribution. Portions of the mixture are molded in a 1-inch circular die at 220° C. employing about 1000 p.s.i. for five minutes. The resulting thermoset samples have a light grayish-brown color and are transparent. They have a Barcol hardness value of 86. On heat aging tests at 250° C. the following low weight losses have been observed on cured test discs: 17 hours, 2.82%; 53.3 hours, 2.84%; 119.3 hours, 3.07%; 189 hours, 3.51%; and 235 hours, 3.88%.

Following the above procedure and using equimolar amounts, cured thermoset polymer compositions of each of the thermoplastic polymers provided by Example 1–6 are prepared. These formed cured, thermoset polymers are also hard and transparent. For example, in respect to hardness, the cured bis(tolylene)oxy polymer of Example 6 using t-butyl hydroperoxide as curing agent has a Barcol hardness value of 80; and the cured polymer of Example 5, having both 2-butenylene and xylylene linkages, using benzoyl peroxide as curing agent has a Barcol hardness value of 68.

Example 9

PREPARATION OF 5-ALLYLISOCYANURATE POLYMER CONTAINING ALKYLENE LINKAGES

A slurry of 39.0 g. (0.2 mol) of trisodium cyanurate in 150 ml. of dimethylformamide is heated to 120° C. and a solution of 25.4 g. (0.2 mol) of 1,4-dichlorobutane and 15.3 g. (0.2 mol) of allyl chloride in 100 ml of dimethylformamide is added dropwise over a one hour period. Stirring is continued at 110° C. to 115° C. for 15.5 hours. The slurry is cooled to room temperature and filtered. The dimethylformamide is removed from the filtrate by evaporation under reduced pressure at 100° C. to leave a heavy, syrupy residue amounting to 49.6 g. of product polymer having an iodine number of 88.0. The polymer is dissolved in chloroform, and the solution is washed with dilute sodium hydroxide solution and with water. The washed solution is dried over magnesium sulfate and the solvent is removed by evaporation under reduced pressure. The uncured polymer is soluble in benzene and chloroform and is insoluble in ether, n-hexane and water.

A portion of the polymer is mixed with 2% by weight of t-butyl perbenzoate and is heated at 100° C. for fifteen minutes to produce a rigid, transparent molding with a Barcol hardness of 78.

Example 10

PREPARATION OF 5-ALLYLISOCYANURATE POLYMER CONTAINING DIALKYLENE OXY LINKAGES

A slurry of 19.5 g. (0.1 mol) of trisodium cyanurate in 100 ml. of dimethylformamide is heated to 110° C. To this mixture is added dropwise, over a period of two hours, a solution of 14.3 g. (0.1 mol) of bis(2-chloroethyl)ether and 7.7 g. (0.1 mol) of allylchloride in 100 ml of dimethylformamide. Stirring is continued at 110° C. for eight hours, the mixture is cooled to room temperature and filtered.

The filtrate is evaporated under reduced pressure at 100° C. to remove dimethylformamide leaving 20.8 g. of polymer product as a light yellow syrup. The product is further treated by dissolving in methylene chloride and filtering to remove residual traces of salts, followed by evaporation of the solvent. The infrared spectrum of the product confirms the presence of the ether linkage. The product is soluble in acetone, benzene, and xylene and insoluble in water.

A portion of the polymer is mixed with 2% by weight of t-butyl perbenzoate and is cured by heating at 120° C. for thirty minutes. The resulting molding is a hard, transparent thermoset material.

Example 11

PREPARATION OF 5-ALLYLISOCYANURATE POLYMER CONTAINING ALKYLENE LINKAGES

A slurry of 39.0 g. (0.2 mol) of trisodium cyanurate in dimethylformamide is heated to 120° C. Dropwise addition of a solution of 19.8 g. (0.2 mol) of 1,2-dichloroethane and 15.3 g. (0.2 mol) of allylchloride in 100 ml. of dimethylformamide is carried out over a period of one hour. Stirring is continued at 120° C. for 16.5 hours, and the reaction mixture is cooled and filtered.

The filtrate is evaporated under reduced pressure to remove dimethylformamide, leaving 33.3 g. of polymer product as an amber-colored syrup with an iodine number of 114.

A portion of the resin is mixed with 2% by weight of t-butyl perbenzoate and is heated ten minutes at 100° C. to produce a hard, transparent molding.

Example 12

PREPARATION OF POLYMER CONTAINING 2-BUTYLENE W LINKAGES AND ETHYL AND ALLYL R GROUPS

To a three-neck, 500-ml. round bottom flask is added a mixture of 39.0 g. (0.2 mol) of trisodium cyanurate and 50 ml. of dimethylformamide. The flask is equipped with a Dry Ice condenser, a stirrer, a thermometer, and an addition funnel. The dimethylformamide mixture is heated to 100° C. and a combination of 25 g. (0.2 mol) of 1,4-dichloro butene-2, 10.2 g. (0.133 mol) of allyl chloride, 7.2 g. (0.066 mol) of ethyl bromide, and 100 ml. of dimethylformamide are slowly added over a three-hour period to the reaction mixture. The reaction mixture is maintained for an additional three-hour period at a temperature of 90° C. to 100° C.

The reaction mixture is cooled to room temperature and is filtered. The removed precipitate is treated with dilute hydrochloric acid to recover unreacted cyanuric acid.

The dimethylformamide containing the desired polymer is evaporated in vacuo to yield 48.5 g. of a solid residue. The polymer residue is triturated with 200 ml. of warm distilled water and the triturate is filtered. The precipitate of the desired polymer is washed with 200 ml. of warm distilled water. The polymer is removed from the wash water by filtration, the washed solid is discarded, and the removed polymer is added to water. The aqueous suspension of the solid polymer is made slightly acid by the addition with stirring of concentrated hydrochloric acid. The acidified polymer mixture is filtered to remove the polymer and the polymer is washed free of ionic chloride with distilled water. The washed polymer is finally washed with methanol and is dried in vacuo over phosphorous pentoxide. The white crystalline solid product of the desired polymer melts in the range of 100° C. to 135° C. and is obtained in a yield of 32.4 g.

The results of infrared analysis are consistent with the structure of the desired isocyanurate polymer, i.e., a polymer having 2-butenylene linkages and having both allyl and ethyl R groups.

A portion of the polymer is cured following the curing procedure of Example 9 to obtain a hard, transparent molded part having a Barcol hardness value of 88.

Example 13

PREPARATION OF POLYMER CONTAINING ETHYLENE LINKAGES AND ETHYL AND ALLYL R GROUPS

To a three-neck 500 ml. round bottom flask are added 39.0 g. (0.2 mol) of trisodium cyanurate and 500 ml. of dimethyl formamide. The flask is equipped as described in Example 12. The dimethylformamide mixture is heated to 100° C. and to the heated mixture is added dropwise a slurry of 37.5 g. (0.2 mol) of 1,2-dibromoethane, 10.2 g. (0.133 mol) of allyl chloride, and 7.2 g. (0.066 mol) of ethyl bromide in 100 ml. of dimethylformamide. The reactants are added over a period of three hours, which is followed by an additional three-hour reaction time during which the reaction temperature is maintained at about 90° C. to 100° C. The reaction mixture is cooled to room temperature and is filtered.

The precipitate is added to 200 ml. of distilled water and the aqueous mixture is acidified with hydrochloric acid to recover unreacted cyanuric acid. The dimethylformamide filtrate is evaporated in vacuo to dryness leaving a partially crystalline solid residue. The residue is triturated with 200 ml. of warm distilled water and the aqueous mixture is made slightly acidic by the addition of concentrated hydrochloric acid. The polymer is separated by decanting and is further triturated with an additional 200 ml. of warm distilled water. The recovered triturated polymer then is dissolved in chloroform. The chloroform solution of the polymer is filtered to remove undesired solid material. The precipitate is discarded.

The filtered chloroform solution of the desired polymer is then evaporated in vacuo to dryness. The dry residue obtained is a clear, amber-colored syrup consisting of desired polymer. Yield: 31.5 g. Calculated: Iodine number, 88.6. Found: Iodine number, 80.7.

The results of infrared analysis is consistent with the structure of the desired polymer having ethylene linkages and allyl and ethyl R groups.

A portion of the polymer is cured by following the curing procedure of Example 9 to obtain a hard, transparent molded part.

What is claimed is:

1. A process for manufacturing thermoplastic polymers comprising reacting a compound selected from the group consisting of organic dibromides, dichlorides and diiodides having from about two to twenty-two carbon atoms with at least an equimolar amount of a salt of cyanuric acid and at least an equimolar amount of a third reactant selected from the group consisting of organic monobromides, monochlorides and monoiodides, at least twenty mole percent of said third reactant being selected from the group consisting of allyl and substituted allyl bromides, chlorides and iodides, in an inert reaction medium at an elevated temperature to yield a polymeric product in which there are at least two isocyanurate nuclei per molecule.

2. Curing a polymeric product resulting from the process of claim 1 by reacting with a free radical initiator to yield a solid thermoset resin.

3. A polymeric product obtained by reacting together α,α'-dichloro-p-xylene, trisodium cyanurate and allyl chloride according to the method of claim 1.

4. A polymeric product obtained by reacting together 1,4-dichloro-2-butene, trisodium cyanurate and allyl chloride according to the method of claim 1.

5. A polymeric product obtained by reacting together 1,4-dichloro-2-butene, trisodium cyanurate, allyl chloride and chloroacetonitrile according to the method of claim 1.

6. A polymeric product obtained by reacting together 1,4-dichloro-2-butene, trisodium cyanurate, allyl chloride and α,α'-dichloro-p-xylene according to the method of claim 1.

7. A polymeric product obtained by reacting together bis(α-chloro-p-tolyl) ether, trisodium cyanurate and allyl chloride according to the method of claim 1.

8. A polymeric product obtained by reacting together 1,4-dichlorobutane, trisodium cyanurate and allyl chloride according to the method of claim 1.

9. A polymeric product obtained by reacting together bis(2-chloroethyl) ether, trisodium cyanurate and allyl chloride according to the method of claim 1.

10. A polymeric product obtained by reacting together 1,2-dichloroethane, trisodium cyanurate and allyl chloride according to the method of claim 1.

11. A polymeric product obtained by reacting together 1,4-dichloro-2-butene, trisodium cyanurate, allyl chloride and ethyl bromide, according to the method of claim 1.

12. A polymeric product obtained by reacting together 1,2-dibromoethane, trisodium cyanurate, allyl chloride and ethyl bromide, according to the method of claim 1.

13. Hard, transparent solid thermoset resins made according to the method of claim 2.

References Cited by the Examiner

UNITED STATES PATENTS

| | | | |
|---|---|---|---|
| 2,894,950 | 7/59 | Doyd et al. | 260—2 |
| 2,947,736 | 8/60 | Lundberg | 260—2 |
| 3,061,591 | 10/62 | Roth | 260—2 |

LEON J. BERCOVITZ, *Primary Examiner.*

J. R. LIBERMAN, *Examiner.*